(12) United States Patent  (10) Patent No.: US 7,982,141 B2
Takahashi et al.  (45) Date of Patent: Jul. 19, 2011

(54) COORDINATE DETECTING DEVICE, WRITING INSTRUMENT, AND COORDINATE INPUTTING SYSTEM

(75) Inventors: Sadao Takahashi, Kanagawa (JP); Satoshi Suga, Kanagawa (JP); Toshiyuki Furuta, Kanagawa (JP); Tomohiko Beppu, Kanagawa (JP); Hirofumi Horikawa, Kanagawa (JP); Yuuta Hamada, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 842 days.

(21) Appl. No.: 11/676,906

(22) Filed: Feb. 20, 2007

(65) Prior Publication Data

US 2007/0195070 A1  Aug. 23, 2007

(30) Foreign Application Priority Data

Feb. 20, 2006 (JP) .................. 2006-042370

(51) Int. Cl.
G06F 3/043 (2006.01)

(52) U.S. Cl. ............... 178/18.04; 178/18.01; 178/19.01; 345/177; 345/179

(58) Field of Classification Search .......... None
See application file for complete search history.

(56) References Cited

U.S. PATENT DOCUMENTS

| 4,246,439 A | | 1/1981 | Romein |
| 5,717,168 A | * | 2/1998 | DeBuisser et al. ......... 178/18.04 |
| 2003/0197692 A1 | * | 10/2003 | Tsuji ............................. 345/179 |

FOREIGN PATENT DOCUMENTS

| JP | 54-137921 | 10/1979 |
| JP | 2002-509317 | 3/2002 |
| JP | 2004-70887 | 3/2004 |
| JP | 2004-192142 | 7/2004 |
| JP | 2005-122682 | 5/2005 |
| WO | WO 99/36883 | 7/1999 |

OTHER PUBLICATIONS

U.S. Appl. No. 12/046,868, filed Mar. 12, 2008, Hamada, et al.
Office Action issued Sep. 14, 2010, in Japanese Patent Application No. 2006-042370 filed Feb. 20, 2006.

* cited by examiner

*Primary Examiner* — Bipin Shalwala
*Assistant Examiner* — Kelly Hegarty
(74) *Attorney, Agent, or Firm* — Oblon, Spivak, McClelland, Maier & Neustadt, L.L.P.

(57) ABSTRACT

A pen includes a first speaker that outputs a first signal and a second speaker that outputs a second signal. The first and second speakers are located away from a tip of the pen at respectively different locations. The second signal is delayed with respect to the first signal by a time shorter than a cycle of the first signal. An interpolation time is set between the times of generation of the first and second signals. Interpolated positions of the first and second speakers at the interpolation time are estimated, and position of the tip of the pen is calculated from the interpolated positions of the first and second speakers.

10 Claims, 12 Drawing Sheets

COORDINATE DETECTING DEVICE, WRITING INSTRUMENT, AND COORDINATE INPUTTING SYSTEM

CROSS-REFERENCE TO RELATED APPLICATIONS

The present document incorporates by reference the entire contents of Japanese priority document, 2006-042370 filed in Japan on Feb. 20, 2006.

BACKGROUND OF THE INVENTION

1. Field of the Invention

The present invention generally relates to a coordinate detecting device, a writing instrument, and a coordinate inputting system. The present invention specifically relates to a coordinate detecting device that is suited for detection of a trajectory of a pen tip on a paper.

2. Description of the Related Art

Conventionally, a following coordinate detecting device for inputting coordinates is known (refer to Japanese Patent Application Laid-open Nos. 2002-509317, 2004-70887, and S54-137921). The coordinate detecting device inputs the coordinates by disposing a pair of ultrasonic receivers on a paper, using the ultrasonic receivers to receive ultrasonic waves transmitted from a writing instrument, and estimating a position of the writing instrument from propagation times of the ultrasonic waves using triangulation.

In the coordinate detecting device described in Japanese Patent Application Laid-open No. 2002-509317, two ultrasonic transmitters are arranged in the pen. The two ultrasonic transmitters simultaneously transmit ultrasonic waves at respectively different transmitting frequencies. The coordinate detecting device includes a detector and a unit for estimating the position of the pen tip. The detector receives the ultrasonic waves transmitted from the two ultrasonic transmitters. The unit calculates positions of the ultrasonic transmitters at a given time by separating two frequencies and estimates the correct pen tip position from the calculated result.

In the coordinate detecting devices described in Japanese Patent Application Laid-open Nos. 2004-70887 and Japanese Patent Application Laid-open No. S54-137921, two ultrasonic sources are arranged in the pen and two ultrasonic receivers are arranged in the coordinate detecting device. The ultrasonic sources output ultrasonic waves and the ultrasonic receivers receive the ultrasonic waves output from the pen. The ultrasonic sources alternately emit the ultrasonic waves. The coordinate detecting device measures propagation times of the ultrasonic waves received by the ultrasonic receiver and estimates the position the pen tip from a difference between the propagation times.

However, the coordinate detecting device described in Japanese Patent Application Laid-open No. 2002-509317 requires a device, such as a filter, in the coordinate detecting device to discriminate the two frequencies. Therefore, not only does the coordinate detecting device become costly, but calculation of a correct reception time becomes difficult because the use of the filter causes changes in phases of the received ultrasonic waves.

In the coordinate detecting devices described in Japanese Patent Application Laid-open Nos. 2004-70887 and S54-137921, transmission times of the ultrasonic waves transmitted from the ultrasonic sources differ so that a time difference occurs between time points at which the coordinate detecting device calculates positions of the ultrasonic sources mounted on the pen. If an inclination of the pen changes or the pen tip moves during the time difference, accurate position of the pen tip can not be calculated.

Specifically, the problem that occurs when the inclination of the pen changes or the pen tip moves during the time difference is explained below with reference to FIG. 20 and FIG. 21.

FIG. 20 is a schematic for explaining estimation of a pen tip position. The pen tip is placed on point P0, the pen (not shown) is tilted and rotated at a constant speed around the point P0 without moving the pen tip. The distance between the pen tip and one ultrasonic source (hereinafter, "speaker A") and the distance between the speaker A and another ultrasonic source (hereinafter, "speaker B") are equal.

FIG. 21 is a diagram of pen-tip interpolation times when speaker positions are interpolated. The diagram shows a relationship among a time represented by a solid circle, a time represented by an open circle, and a time represented by an open square. The time represented by the solid circle is when the ultrasonic waves can be received and the speaker positions can be actually identified. The time represented by the open circle is when the positions of the speaker A and the speaker B are acquired by interpolation being performed from a time at which two consecutive positions of the speaker A and the speaker B can be acquired. (However, in actuality, a speaker position corresponding to the time is needed but impossible to acquire. Therefore, the speaker positions are replaced with an inner ratio of the two speaker positions.) The time represented by the open square is when pen tip coordinates can be estimated from the interpolated position of the speaker A and the interpolated position of the speaker B.

In FIG. 21, a horizontal axis is a time axis. The speaker A and the speaker B transmit the ultrasonic waves at a cycle T. The speaker B transmits the ultrasonic waves with a time lag of T/2 cycle from when the speaker A transmits the ultrasonic waves. In FIG. 20, a solid circle on a circumference indicates an acquired speaker position. An open circle on a dotted line indicates an interpolation point of the acquired speaker position used to determine the pen tip position. A cross P0 indicates a point used to estimate a true pen tip position. Small solid circles P0' and P0" near the cross indicate estimated pen tip positions.

Specifically, a method for estimating the pen tip position using the interpolation of the speaker positions will be described with reference to FIG. 20. In FIG. 20, P11, P12, and P13 indicate speaker positions when the position of the speaker A is measured at a certain time interval T. If P11 is acquired at time t, P11 is acquired at time t+T, and P13 is acquired at time t+2T.

P21, P22, and P23 indicate the positions of the speaker B when the position of the speaker B is measured with a half-cycle (T/2) time lag from the cycle at which the position of the speaker A is measured. If P21 is acquired at time t+T/2, P22 is acquired at time t+3T/2, and P23 is acquired at time t+5T/2.

First, a pen tip position (P0") is estimated using P22 and P1(tc2), with P1(tc2) as a center point between P12 and P13. When a line segment connecting P22 and P1(tc2) is extended and P0" is determined so that a length between P1(tc2) and P0" is the same as a length between P22 and P1(tc2), the determined P0" is an estimated pen tip position P0".

Next, a pen tip position (P0') is estimated using P2(tc2) and P12, with P2(tc2) as a center point between P21 and P22. When a line segment connecting P2(tc2) and P12 is extended and P0' is determined so that a length between P12 and P0' is the same as a length between P2(tc2) and P12, the determined P0' is an estimated pen tip position P0'.

However, as is clear in FIG. 20, the estimated results of P0' and P0" are positioned away from the true P0. The reason is because one point used to estimate the position of the pen tip is a measured speaker position with few errors, while the other point is an interpolated speaker position with significant errors. In this way, in the conventional methods, pen-tip position estimation errors become extremely large.

SUMMARY OF THE INVENTION

It is an object of the present invention to at least partially solve the problems in the conventional technology.

According to an aspect of the present invention, a coordinate detecting device includes a first receiving unit that receives a first signal from a first generating unit and a second signal from a second generating unit, the second signal being delayed with respect to the first signal; a second receiving unit that is located at a position different from that of the first receiving unit and receives the first signal and the second signal; a position calculating unit that calculates a first position that is a position of the first generating unit based on a time at which the first receiving unit receives the first signal and a time at which the second receiving unit receives the first signal, and calculates a second position that is a position of the second generating unit based on a time at which the first receiving unit receives the second signal and a time at which the second receiving unit receives the second signal; an interpolating unit that calculates an interpolated position of the first generating unit and an interpolated position of the second generating unit from the first position and the second position; and an estimating unit that estimates a position on a predetermined coordinate plane that is away from the first generating unit and the second generating unit based on the interpolated positions of the first generating unit and the second generating unit calculated by the interpolating unit.

According to still an aspect of the present invention, a writing instrument is used in a coordinate detecting device. The coordinate detecting device including a first receiving unit that receives a first signal from a first generating unit and a second signal from a second generating unit, the second signal being delayed with respect to the first signal; a second receiving unit that is located at a position different from that of the first receiving unit and receives the first signal and the second signal; a position calculating unit that calculates a first position that is a position of the first generating unit based on a time at which the first receiving unit receives the first signal and a time at which the second receiving unit receives the first signal, and calculates a second position that is a position of the second generating unit based on a time at which the first receiving unit receives the second signal and a time at which the second receiving unit receives the second signal; an interpolating unit that calculates an interpolated position of the first generating unit and an interpolated position of the second generating unit from the first position and the second position; and an estimating unit that estimates a position on a predetermined coordinate plane that is away from the first generating unit and the second generating unit based on the interpolated positions of the first generating unit and the second generating unit calculated by the interpolating unit. The writing instrument includes a body having a tip and that can be held by a user; the first generating unit arranged at a position away from the tip of the body and that generates the first signal; and the second generating unit arranged at a position different from that of the first generating unit and that generates the second signal.

According to still another aspect of the present invention, a coordinate inputting system includes a writing instrument and a coordinate detecting device that detects pen tip coordinates. The writing instrument includes a body having a tip and that can be held by a user; a first generating unit arranged at a position away from the tip of the body and that generates a first signal; and a second generating unit arranged at a position different from that of the first generating unit and generates a second signal, the second signal being delayed with respect to the first signal. The coordinate detecting device includes a first receiving unit that receives the first signal from the first generating unit and the second signal from the second generating unit; a second receiving unit located at a position different from that of the first receiving unit and receives the first signal and the second signal; a position calculating unit that calculates a first position that is a position of the first generating unit based on a time at which the first receiving unit receives the first signal and a time at which the second receiving unit receives the first signal, and calculates a second position that is a position of the second generating unit based on a time at which the first receiving unit receives the second signal and a time at which the second receiving unit receives the second signal; a interpolating unit that calculates an interpolated position of the first generating unit and an interpolated position of the second generating unit from the first position and the second position; and an estimating unit that estimates a position on a predetermined coordinate plane that is away from the first generating unit and the second generating unit based on the interpolated positions of the first generating unit and the second generating unit calculated by the interpolating unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

FIG. 1 to FIG. 15 are diagrams of a coordinate detecting device, a writing instrument, and a coordinate inputting system according to a first embodiment of the present invention.

Figure 1:
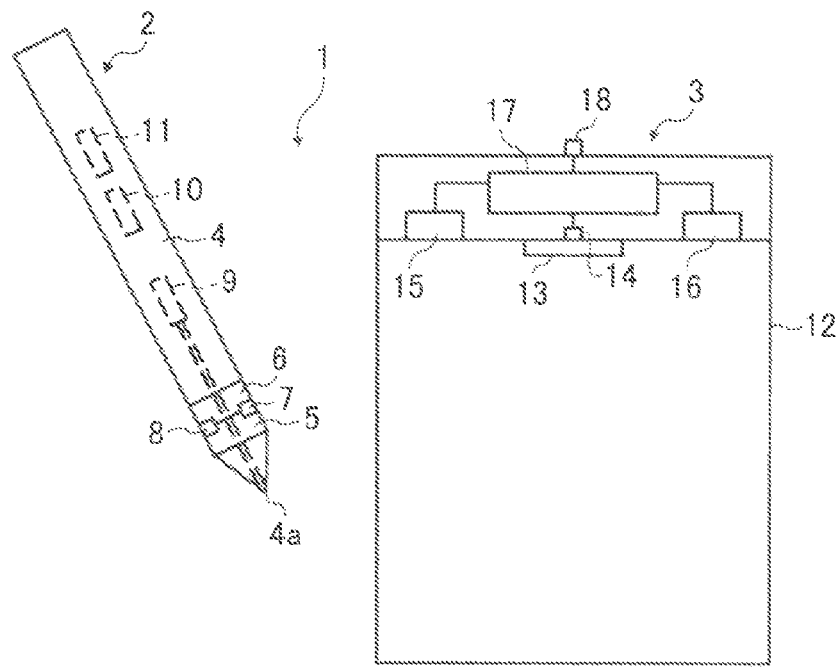
FIG. 1 is a schematic of a coordinate inputting system according to a first embodiment of the present invention.
Figure 2:
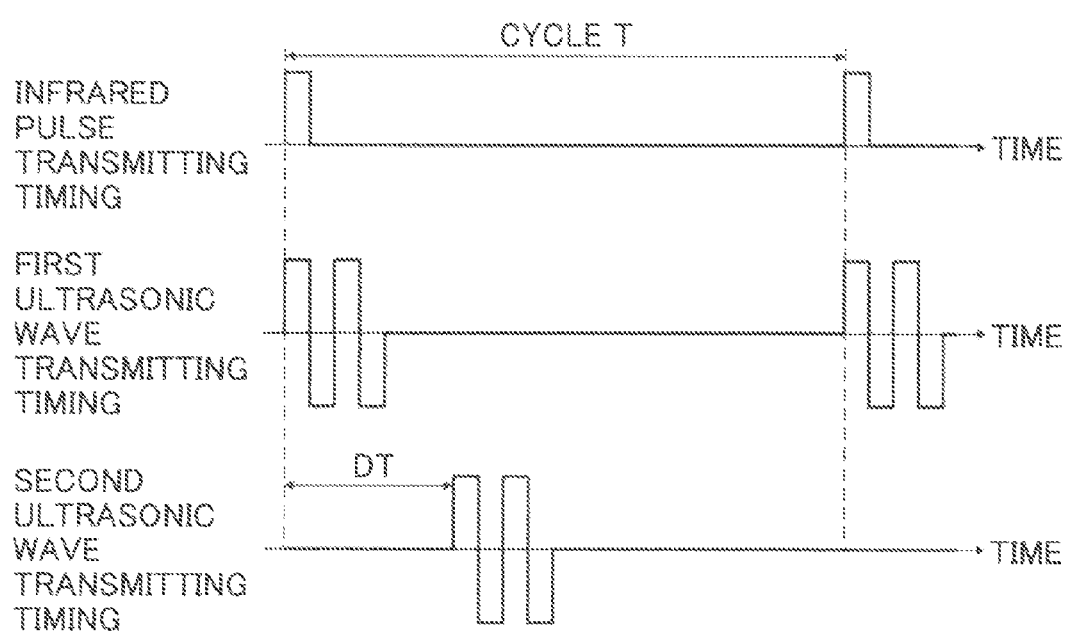
FIG. 2 is a timechart for explaining transmitting timings of infrared pulses and ultrasonic waves from a writing instrument according to the first embodiment of the invention.

As shown in FIG. 1, a coordinate inputting system 1 according to the first embodiment includes a writing instrument 2 and a coordinate detecting device 3. The writing instrument 2 is used to input coordinates. The coordinate detecting device 1 fixes a paper (not shown), receives ultrasonic waves from the writing instrument 2, and detects the coordinates of the position of the tip of the writing instrument 2.

A person holds the writing instrument 2 and writes or draws something on the paper on the coordinate detecting device 1. The writing instrument 2 includes a writing-instrument main body 4, a speaker (a first transmitting unit) 5, a speaker (a second transmitting unit) 6, light emitting diodes (LEDs) (third transmitting units) 7 and 8, and a writing pressure detecting switch (a writing state detecting unit) 9. A pen tip 4a in the writing-instrument main body 4 can be used to write. The pen tip 4a is a position on a predetermined coordinate plane. The speaker 5 is provided in the writing-instrument main body 4, above the pen tip 4a, and transmits ultrasonic waves that are first signals (hereinafter, "first ultrasonic waves"). The speaker 6 is provided in the writing-instrument main body 4, above the speaker 5, and transmits ultrasonic waves that are second signals (hereinafter, "second ultrasonic waves"). The LED 7 and LED 8 are provided in the writing-instrument main body 4, between the speaker 5 and the speaker 6, and used to transmit infrared pulses that are third signals. The writing pressure detecting switch 9 is turned ON when pressure against the paper is detected from the pen tip 4a while writing. The writing pressure detecting switch 9 is turned OFF when the pen tip 4a is removed from the paper.

The writing instrument 2 includes an infrared pulse transmitting circuit 10 and an ultrasonic wave transmitting circuit 11. When the writing pressure detecting switch 9 is turned ON, the infrared pulse transmitting circuit 10 operates the LED 7 and the LED 8 and emits infrared pulses at a cycle T. The ultrasonic wave transmitting circuit 11 transmits the first ultrasonic waves from the speaker 5 at a timing at which the infrared pulse transmitting circuit 10 transmits the infrared pulses and at the same cycle T as the cycle at which the infrared pulses are transmitted. The ultrasonic wave transmitting circuit 11 also transmits the second ultrasonic waves from the speaker 6 with a delay after the transmission of the first ultrasonic signals. The delay is a time (DT) shorter than the cycle T. (see FIG. 2).

While pressure against the pen tip 4a is detected, the infrared pulses, the first ultrasonic waves, and the second ultrasonic waves are transmitted at a constant cycle. The cycle is 60 hertz to 100 hertz. Delay time DT is preferably not half of the cycle at which the infrared pulses are transmitted. The reason is, as described hereafter, the position of the pen tip 4a can be calculated with more accuracy when the DT is a value other than half of the cycle at which the infrared pulses are transmitted, when the positions of the speaker 5 and the speaker 6 are interpolated.

It is preferable that the DT is close to "0". However, if the DT is too <short, interference may occur between the ultrasonic waves transmitted from the speaker 5 and the ultrasonic waves transmitted from the speaker 6, or the coordinate detecting device 3 may fail to detect the ultrasonic waves transmitted from the speaker 6. Therefore, the delay time is preferably set depending on a processing speed of the coordinate detecting device 3 and the like.

At the same time, the coordinate detecting device 3 includes a main body 12, a clip 13, a photo diode (a third receiving unit) 14, a microphone (a first receiving unit) 15, a microphone (a second receiving unit) 16, a coordinate detecting unit 17 (see FIG. 3), and an external interface 18. The paper is disposed on the main body 12. The clip 13 is provided in the main body 12 and used to fix the paper to the main body 12. The photo diode 14 is provided in the main body 12 and receives the infrared pulses transmitted from the writing instrument 2. The microphone 15 and the microphone 16 are provided in differing positions in the main body 12 and receive the first ultrasonic waves and the second ultrasonic waves. The coordinate detecting unit 17 is mounted on the main body 12 and calculates the coordinates (position) of the pen tip 4a based on the infrared pulses and the ultrasonic waves received by the photodiode 14, the microphone 15, and the microphone 16. The external interface 18 transfers the coordinates of the pen tip 4a detected by the coordinate detecting unit 17 to an external device, such as a computer.

A power supply used to operate the writing instrument 3 and the coordinate detecting device 3 is a battery or an external power supply (not shown).

Figure 3:
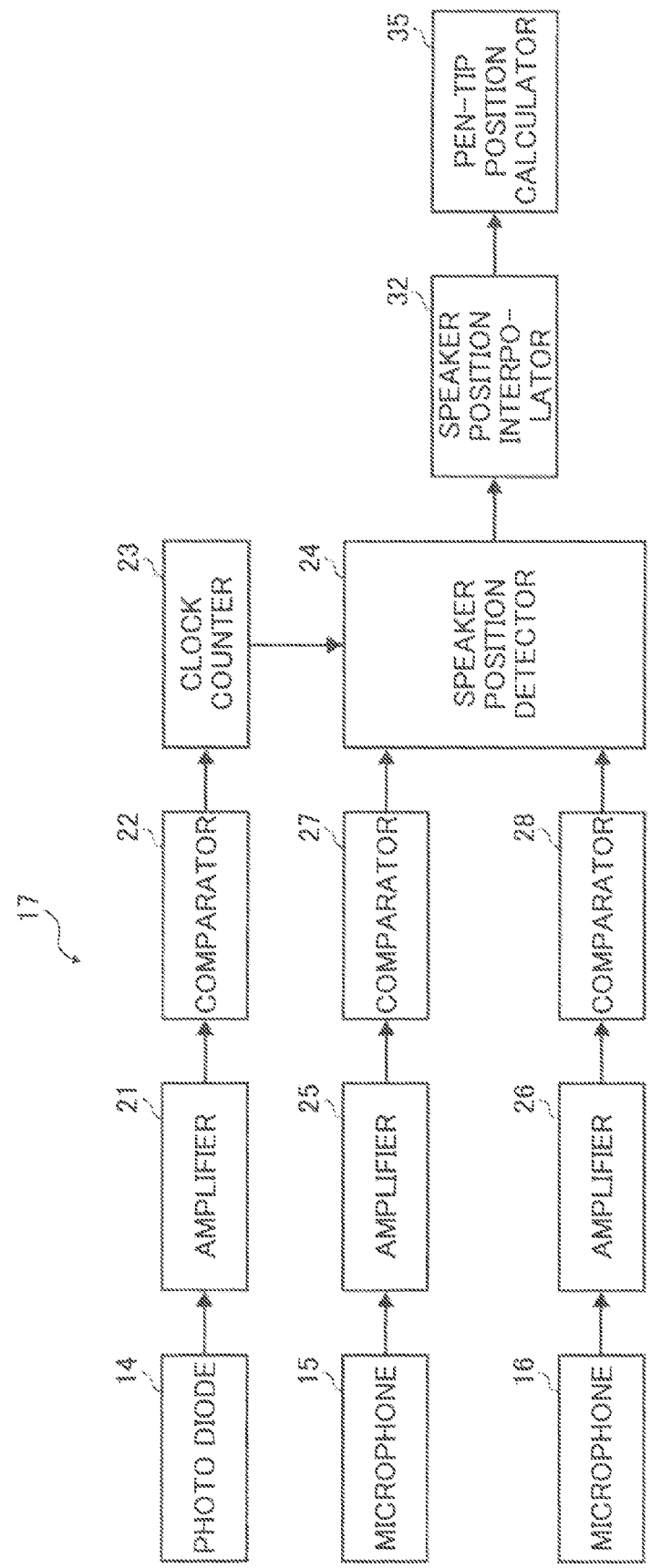
FIG. 3 is a block diagram of a coordinate detecting device in the coordinate inputting system according to the first embodiment of the invention.

FIG. 3 is a block diagram of the coordinate detecting device 3. When the photo diode 14 detects the infrared pulses transmitted from the LED 7 and the LED 8, an amplifier 21 amplifies the infrared pulses. A comparator 22 compares the amplified infrared pulses with a threshold set by the comparator 22 and judges the signal level of the infrared pulses.

When judged that the infrared pulse is received, the comparator 22 outputs a signal to reset a clock counter 23. When the clock counter 23 is reset, values of the first ultrasonic waves and the second ultrasonic waves previously inputted into a speaker position detector 24 are reset. According to the present embodiment, the comparator 22 and the clock counter 23 form a resetting unit.

The microphone 15 and the microphone 16 receive the ultrasonic waves simultaneously transmitted with the infrared pulses transmitted from the LED 7 and the LED 8. The microphone 15 and the microphone 16 receive the ultrasonic waves with a slight delay, after receiving the infrared pulses. An amplifier 25 and an amplifier 26 respectively amplify the ultrasonic waves inputted into the microphone 15 and the microphone 16. A comparator 27 and a comparator 28 compare the amplified ultrasonic waves with thresholds set by the comparator 27 and the comparator 28 and judge the signal levels of the ultrasonic waves.

Figure 4:
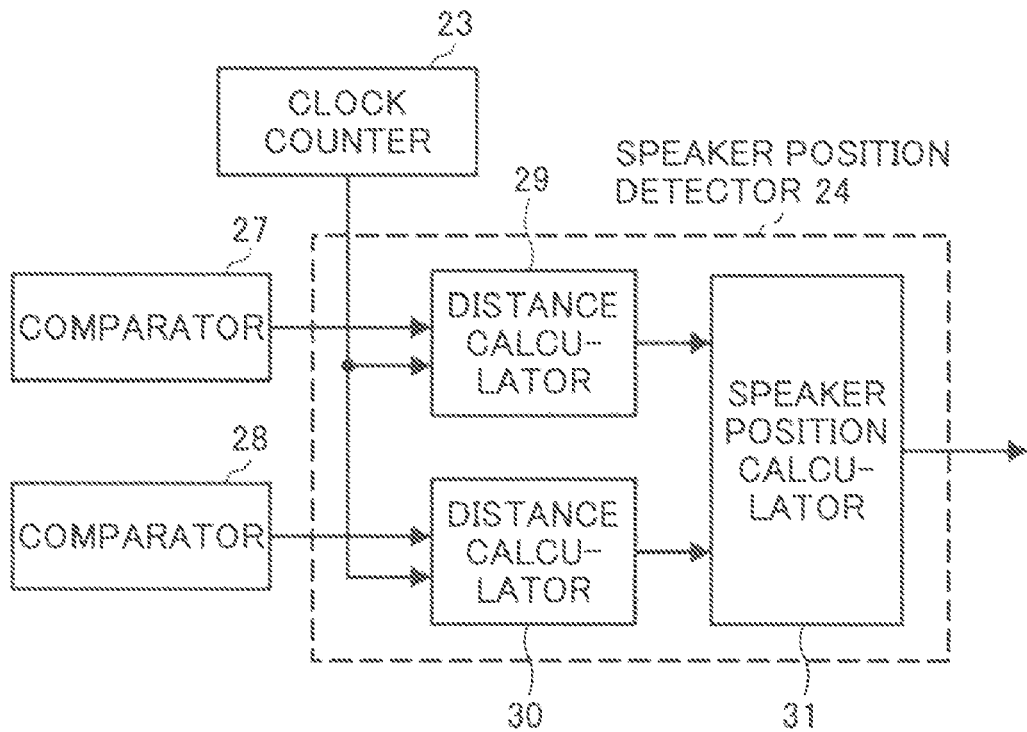
FIG. 4 is a block diagram of a speaker position detector in the coordinate inputting system according to the first embodiment of the invention.

When judged that the ultrasonic waves are received, the comparator 27 and the comparator 28 output status signals to the speaker position detector 24. A status signal gives notification that the ultrasonic wave has been received. As shown in FIG. 4, the speaker position detector 24 includes a distance calculator 29, a distance calculator 30, and a speaker coordinate calculator 31. The distance calculator 29 and the distance calculator 30 calculate the distance between the microphone 15 and the microphone 16 using the clock counter 23 and the status signals from the comparator 27 and the comparator 28. The speaker coordinate calculator 31 calculates the coordinates of the speaker 5 from the respective distances of the microphone 15, the microphone 16, and the speaker 5. The speaker coordinate calculator 31 also receives the ultrasonic waves transmitted from the speaker 6 using the microphone 15 and the microphone 16. The ultrasonic waves are transmitted with a time lag of DT after the transmission of the infrared pulses. Then, the speaker coordinate calculator 31 similarly calculates the coordinates of the speaker 6 from the respective distances of the microphone 15, the microphone 16, and the speaker 6.

In other words, the speaker position detector 24 forms a position calculating unit. The position calculating unit calculates the position of the speaker 5 based on the time at which the microphone 15 receives the first ultrasonic waves and the time at which the microphone 16 receives the first ultrasonic wave. In addition, the position calculating unit calculates the position of the speaker 6 based on the time at which the microphone 15 receives the second ultrasonic waves and the time at which the microphone 16 receives the second ultrasonic waves.

When the speaker coordinates detected by the speaker position detector 24 are expressed by a symbol P{speaker number}{coordinate number}, the speaker coordinates are inputted into a speaker position interpolator (a position interpolating unit) 32 as a sequence of coordinates, such as P{1}{1}, P{2}{1}, P{1}{2}, P{2}{2}, P{1}{3}, P{2}{3}, P{1}{4}, and P{2}{4}.

However, if the pen tip 4a position is calculated using the sequence of coordinates as is, only an incorrect pen tip 4a position can be calculated because the position of the speaker 5 and the position of the speaker 6 having the same coordinate numbers are not those that have been detected at the same time. Provision of two speakers, the speaker 5 and the speaker 6, becomes meaningless.

Therefore, the speaker position interpolator 32 is required to interpolate the speaker coordinates so that the speaker coordinates are those detected at the same time and enhance the calculation accuracy of the pen tip 4a position.

However, a speed of the pen tip 4a is not constant. To be exact, speaker positions that are of the same time cannot be interpolated and determined. However, the ultrasonic waves are transmitted at a high-speed cycle of about 100 hertz. Therefore, it can be assumed that the pen tip 4a is moving at a constant speed during a number of consecutive sequences of coordinates.

Figure 5:
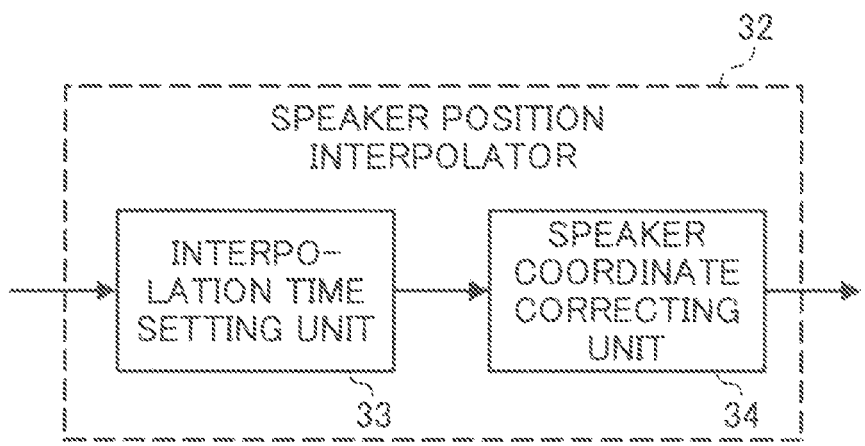
FIG. 5 is a block diagram of a speaker position interpolator in the coordinate inputting system according to the first embodiment of the invention.

The speaker position interpolator 32 according to the embodiment interpolates and determines the speaker positions based on the above-described assumption. Hereafter, a configuration of the speaker position interpolator 32 will be explained. As shown in FIG. 5, the speaker position interpolator 32 includes an interpolation time setting unit 33 and a speaker coordinate correcting unit 34.

The interpolation time setting unit (an interpolation time calculating unit) 33 calculates an interpolation time based on the transmission time of the first ultrasonic wave and the transmission time of the second ultrasonic wave. The interpolation time setting unit 33 sets the interpolation time to an intermediate time between the transmission time of the first ultrasonic wave and the transmission time of the second ultrasonic wave.

The speaker coordinate correcting unit (an interpolation position calculating unit) 34 calculates interpolation position of the speaker 5 and the interpolation position of the speaker 6 corresponding to the interpolation time, based on the calculation result of the interpolation time setting unit 33.

Specifically, T represents the cycle at which the writing instrument 2 transmits the infrared pulses. DT represents the delay time from the transmission of the infrared pulse until the speaker 6 transmits the second ultrasonic wave. If the times at which the speaker 5 transmits the first ultrasonic waves are respectively t1, t2, t3, etc., the positions of the speaker 5 corresponding to the transmission times are P{1}{1}, P{1}{2}, P{1}{3}, etc. The coordinate number includes coordinates on an X-Y plane of the speaker 5 and the speaker 6.

Similarly, when the times at which the speaker 6 transmits the second ultrasonic waves are t1+DT, t2+DT, t3+DT, etc., the positions of the speaker 6 corresponding to the transmission times are P{2}{1}, P{2}{2}, P{2}{3}, etc. Therefore, the interpolation time can be as follows:

$$(tci-) = ti + DT/2 \quad (1)$$

$$(tci+) = ti + DT/2 + T/2 \quad (2)$$

where i represents the coordinate number, tci− represents the intermediate time between ti and ti+DT, and tci+ represents the intermediate time between ti+DT and t{i+1}(=ti+T). The interpolation time setting unit 33 can acquire the interpolation time.

Next, the speaker coordinate correcting unit 34 determines the speaker coordinates corresponding to the interpolation time.

When the respective interpolation coordinates of the speaker 5 and the speaker 6 are P1(tci−) and P2(tci−) when the interpolation time is tci−:

$$P1(tci-) = (P\{1\}\{i\} \times (T-DT/2)/T + P\{1\}\{i+1\} \times DT/2/T) \quad (3)$$

$$P2(tci-) = (P\{2\}\{i\} \times (T-DT/2)/T + P\{2\}\{i-1\} \times DT/2/T) \quad (4)$$

When the respective interpolation coordinates of the speaker 5 and the speaker 6 are P1(tci+) and P2(tci+) when the interpolation time is tci+:

$$P1(tci+) = (P\{1\}\{i\} \times (T/2-DT/2)/T + P\{1\}\{i+1\} \times (T/2+DT/2)/T) \quad (5)$$

$$P2(tci+) = (P\{2\}\{i\} \times (T/2-DT/2)/T + P\{2\}\{i+1\} \times (T/2-DT/2)/T) \quad (6)$$

In this way, the speaker position interpolator 32 determines P1(tci−), P2(tci−), P1(tci+), and P2(tci+) required to calculate the pen tip 4a position.

Figure 8:
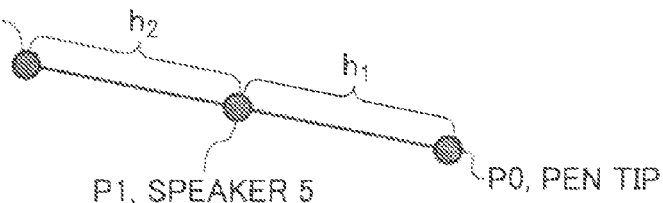
FIG. 8 is a diagram of speakers and pen tip coordinates used to calculate the pen tip position from the speaker positions in the coordinate inputting system according to the first embodiment of the invention.

A pen tip position calculator (an estimating unit) 35 performs a calculation based on P1(tci−), P2(tci−), P1(tci+), and P2(tci+) interpolated by the speaker position interpolator 32, with reference to a coordinate axis shown in FIG. 8, and estimates a position on the coordinate plane of the pen tip 4a that is away from the speaker 5 and the speaker 6.

An equation based on the coordinate axis is as follows:

$$P0 = P1 + (P1-P2)h1/h2 \quad (7)$$

where h1 is the distance from the pen tip 4a to the speaker 5, and h2 is the distance from the speaker 5 to the speaker 6. |P1−P2|<h2 is required to be satisfied. Therefore, when Equation (7) is not satisfied, it is calculated after the coordinates of P2 is corrected and the distance between P2 and P1 is shortened to satisfy Equation (7). <Then, Equation (7) is required to be calculated.

The coordinates of the pen tip 4a calculated in this way is stored in a memory (not shown) mounted on the main body 12 of the coordinate detecting device 3. Then, the coordinates are transmitted to the external device, such as the computer, via the external interface 18.

Next, a method by which the speaker position interpolator 32 interpolates the positions of the speaker 5 and the speaker 6 will be explained in further detail, with reference to FIG. 6 and FIG. 7.

Figure 6:
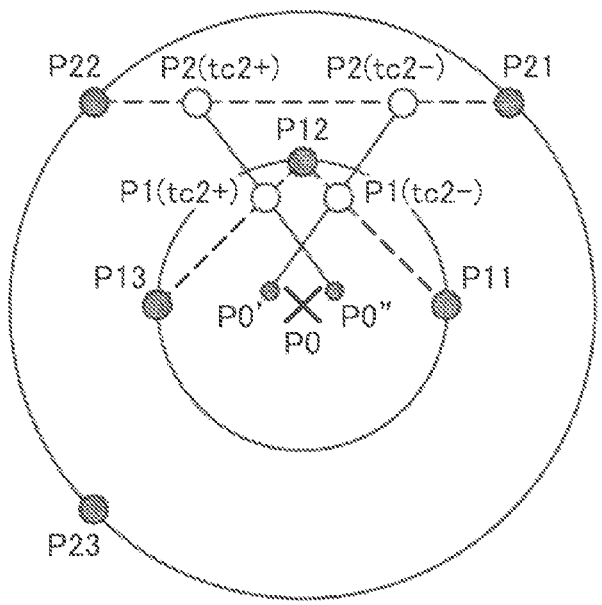
FIG. 6 is a schematic for explaining estimation of a pen tip position by the coordinate inputting system according to the first embodiment of the invention.

FIG. 6 is a diagram of an estimation of the pen tip 4a position when the pen tip 4a is placed in the P0 position, and the writing instrument 2 is rotated at a constant speed, while the pen is tilted and fixed with the pen tip 4a as the center. Here, the length between the pen tip 4a and the speaker 5 and the length between the speaker 5 and the speaker 6 are equal.

Figure 7:
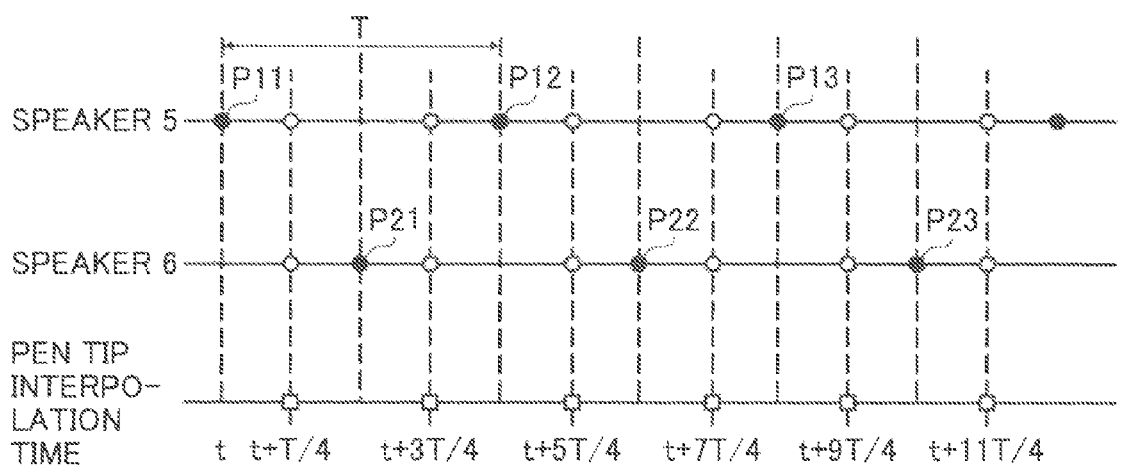
FIG. 7 is a diagram of pen-tip interpolation times when the speaker position interpolator interpolates a speaker position in the coordinate inputting system according to the first embodiment of the invention.

FIG. 7 is a diagram of pen-tip interpolation times when the speaker position interpolator 32 interpolates the speaker positions. The diagram shows a relationship among a time represented by a solid circle, a time represented by an open circle, and a time represented by an open square. The time represented by the solid circle is when the ultrasonic wave can be received and the positions of the speaker 5 and the speaker 6 can actually be identified. The time represented by the open circle o is when the position of the speaker 5 and the position of the speaker 6 are acquired by interpolation being performed from a time at which two consecutive positions of the speaker 5 and the speaker 6 can be acquired. (However, in actuality, the positions of the speaker 5 and the speaker 6 corresponding to the time are needed but impossible to acquire. Therefore, the positions of the speaker 5 and the speaker 6 are respectively replaced with the inner ratio of the two speaker positions.) The time represented by the open square is when the pen tip coordinates are estimated from the interpolated position of the speaker 5 and the interpolated position of the speaker 6

According to the present embodiment, an example in which the delay time DT is set to T/2 is shown. The delay time DT is the delay from when the speaker 5 transmits the first ultrasonic signal until when the speaker 6 transmits the second ultrasonic signal. The interpolation time is set to the intermediate time between the transmission time of the first ultrasonic wave and the transmission time of the second ultrasonic wave.

In FIG. 6, P11, P12, and P13 are the positions of the speaker 5 when the position of the speaker 5 is measured at a certain time interval T. If P11 is acquired at time t, P12 is acquired at time t+T, and P13 is acquired at time t+2T.

P21, P22, and P23 are the positions of the speaker 6 when the position of the speaker 6 is measured with a half-cycle time lag (DT=T/2) from the cycle at which the position of the speaker 5 is measured. If P21 is acquired at time t+T/2, P22 is acquired at time t+3T/2, and P23 is acquired at time t+5T/2.

An acquisition of the positions of the speaker 5 and the speaker 6 at the intermediate time at which P21 and P12 are acquired is required. However, the acquisition is fundamentally impossible. Therefore, an interpolation point is approximately determined by internally dividing the line segments respectively connecting the positions of the speaker 5 and the speaker 6. A point internally dividing the line segment between P11 and P12 at a ratio of 3:1 is P1(tc2−).

P1(tc2−) can be easily calculated from P11 and P12. Similarly, a point internally dividing the line segment between P21 and P22 at a ratio of 1:3 is P2(tc2−). When P1(tc2−) and P2(tc2−) are calculated, neither points are on a circumference indicating the trajectory of the positions of the speaker 5 and the speaker 6. Both points include some errors.

A triangle including the points P0, P12, and P1(tc2−) is similar to a triangle including the points P0, P21, and P2(tc2−). When P0, P1(tc2−), and P2(tc2−) are on a straight line, the estimated position P0' matches P0.

Figure 20:
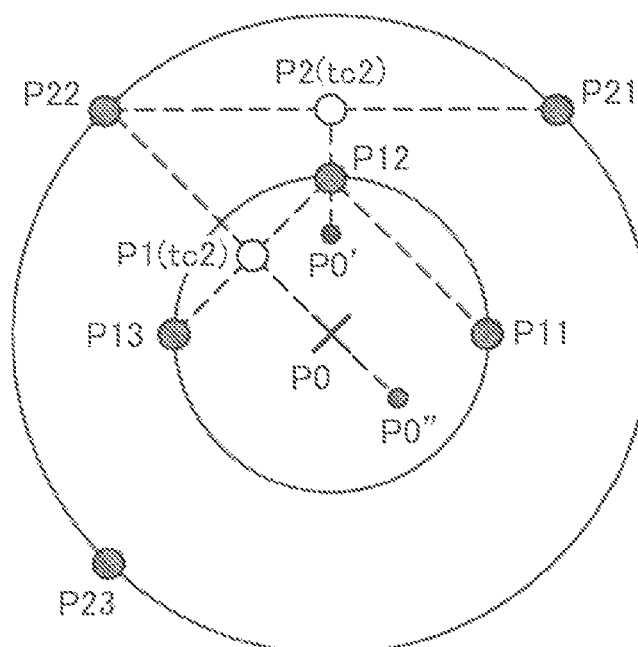
FIG. 20 is a diagram of an estimation of a pen tip position when the writing instrument is rotated at a constant speed, while a pen is tilted and fixed with the pen tip as the center, in a conventional coordinate inputting system.
Figure 21:
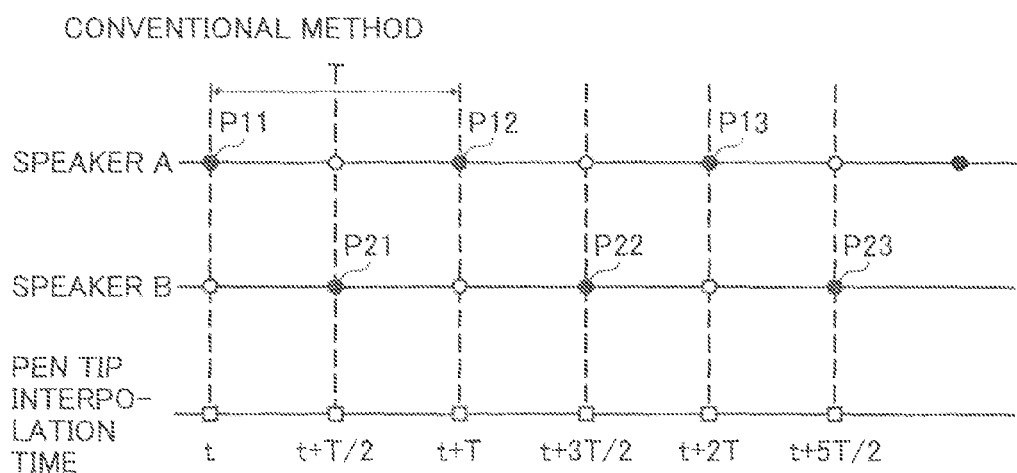
FIG. 21 is a diagram of pen-tip interpolation times when the conventional coordinate inputting system interpolates a speaker position.

In other words, even if large errors occur between the positions of P1(tc2−) and P2(tc2−) and the positions where P1(tc2−) and P2(tc2−) should be, the errors are smaller, the closer the positions are to meeting the above-described requirement. On the other hand, in conventional methods, such as that shown in FIG. 20 and FIG. 21, there are no such similarities. Therefore, the errors are directly reflected in the pen tip position estimation. When the interpolation time is set to the intermediate time between the transmission time of the first ultrasonic wave and the transmission time of the second ultrasonic wave, as according to the embodiment, the interpolated point is close to meeting the requirement. Therefore, the errors between P0 and P0' are significantly small compared to those in the conventional method.

An acquisition of the positions of the speaker 5 and the speaker 6 at the intermediate time at which P12 and P22 are acquired is required. However, for the same reason described above, the interpolation point is approximately determined by the line segments respectively connecting the positions of the speaker 5 and the speaker 6 being internally divided. A point internally dividing the line segment between P12 and P13 at a ratio of 1:3 is P1(tc2+).

Similarly, a point internally dividing the line segment between P21 and P22 at a ratio of 3:31 is P2(tc2+). When P1(tc2+) and P2(tc2+) are calculated in this way, neither points are on the circumference indicating the trajectory of the positions of the speaker 5 and the speaker 6. Both points include some errors. The errors between P0 and P0" are significantly small compared to those in the conventional method for the same reason described above, in this case, as well.

The pen tip positions P0' and P0" estimated in this way are positioned closer to P0 than those estimated using the conventional method, and the estimation errors are clearly smaller.

Figure 9:
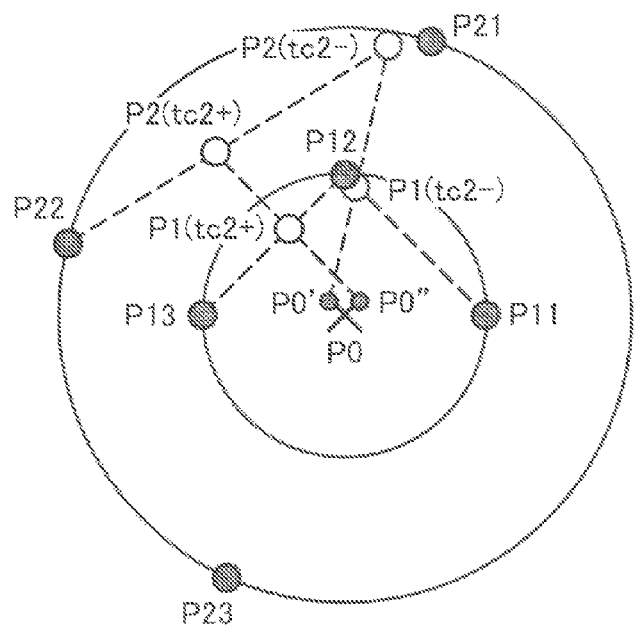
FIG. 9 is a diagram of another example of the estimation of the pen tip position when the writing instrument is rotated at a constant speed, while the pen is tilted and fixed with the pen tip as the center, in the coordinate inputting system according to the first embodiment of the invention.
Figure 10:
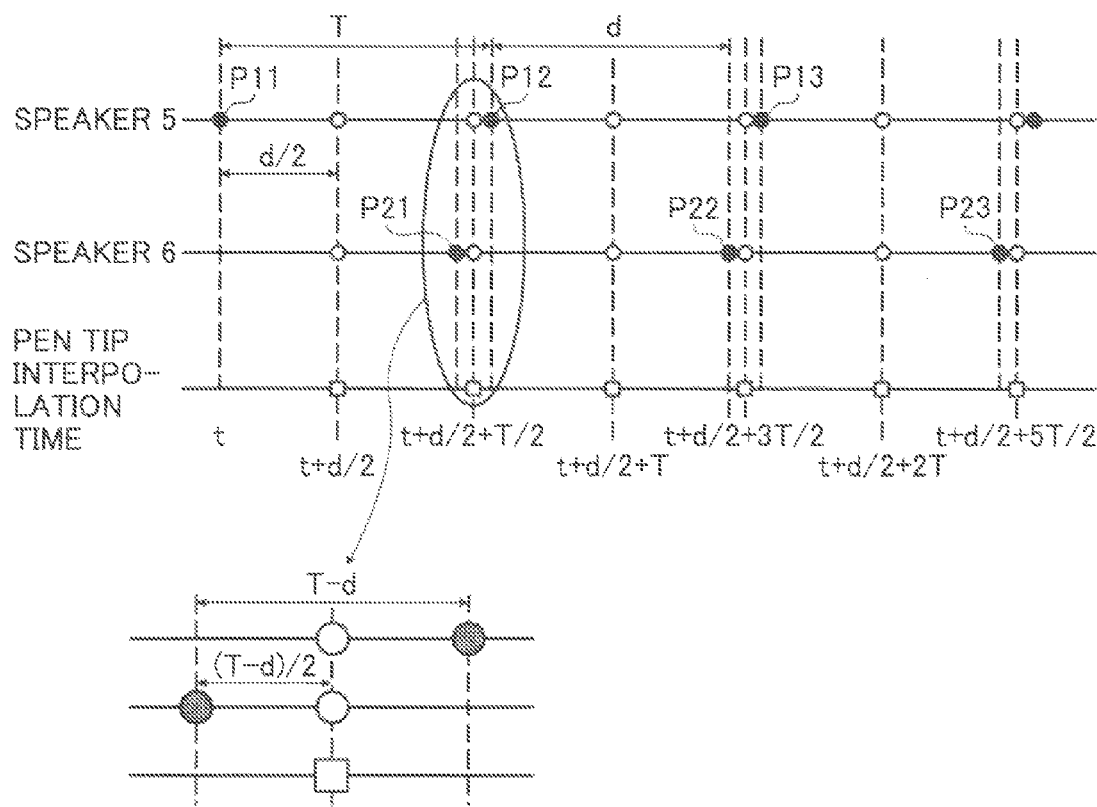
FIG. 10 is a diagram of another example of the pen-tip interpolation times when the speaker position interpolator interpolates the speaker position in the coordinate inputting system according to the first embodiment of the invention.

FIG. 9 and FIG. 10 are diagrams of examples in which the delay time DT is set to 0.85T. The delay time DT is the delay from when the speaker 5 transmits the first ultrasonic signal until when the speaker 6 transmits the second ultrasonic signal. The delay time DT is preferably near "0" or as close to the cycle T as possible. In FIG. 9 and FIG. 10 shows an example in which the delay time DT is as close to the cycle T as possible. However, the delay time DT can be set near "0", for example, 0.15T.

In FIG. 9, P11, P12, and P13 are the positions of the speaker 5 when the position of the speaker 5 is measured at a certain time interval T. If P11 is acquired at time t, P12 is acquired at time t+T, and P13 is acquired at time t+2T.

P21, P22, and P23 are the positions of the speaker 6 when the position of the speaker 6 is measured with a DT (0.85T) lag after the time at which the position of the speaker 5 is measured. If P21 is acquired at time t+DT, P22 is acquired at time t+DT+T, and P23 is acquired at time t+DT+2T.

The speaker position interpolator 32 respectively interpolates P1(tc2−), P2(tc2−), P1(tc2+), and P2(tc2+), using the same method described in FIG. 6 and FIG. 7. As shown in FIG. 9, P1(tc2−) is extremely close to P12. P2(tc2−) is extremely close to P21. Therefore, the pen tip 4a position P0' estimated from P1(tc2−) and P2(tc2−) is extremely close to P0. The estimation error is smaller than when the delay time DT is set to t/2 (namely, 0.5T).

P1(tc1+) and P2(tc2+) are respectively extremely close to the center point between P12 and P13 and the center point between P21 and P22. In other words, a triangle formed by P0, P12, and P1(tc2+) and a triangle formed by P0, P22, and P2(tc2+) are very similar. A ratio of the size of the two triangles is h1:(h1+h2). Therefore, the pen tip 4a position P0" estimated from P2(tc2+) and P1(tc2+) is extremely close to P0. The estimation error is smaller than when the delay time is set to T/2.

Figure 11:
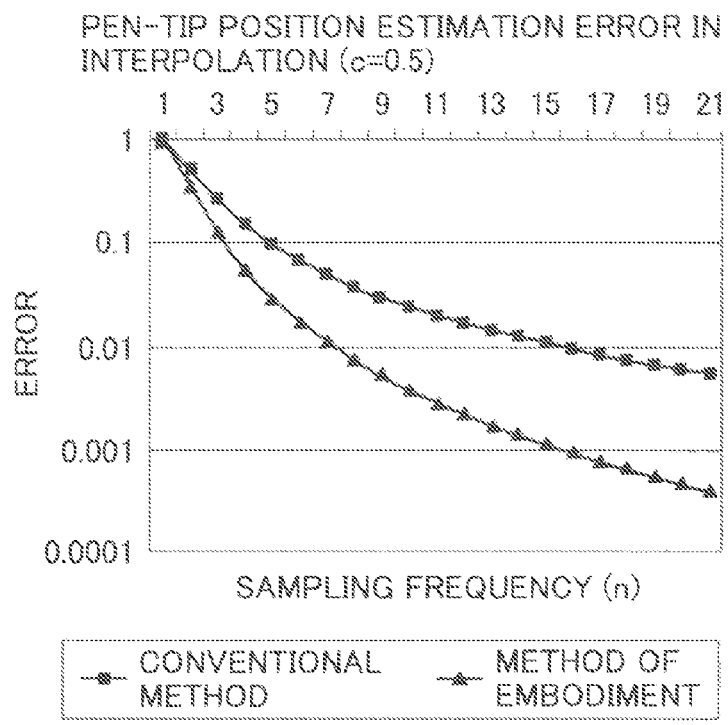
FIG. 11 is a diagram of pen-tip position estimation errors caused by an interpolation method used in the coordinate inputting system according to the first embodiment of the invention and a relationship between sampling frequencies and pen-tip position estimation errors according to the present method and a conventional method when a delay time C is 0.5.
Figure 12:
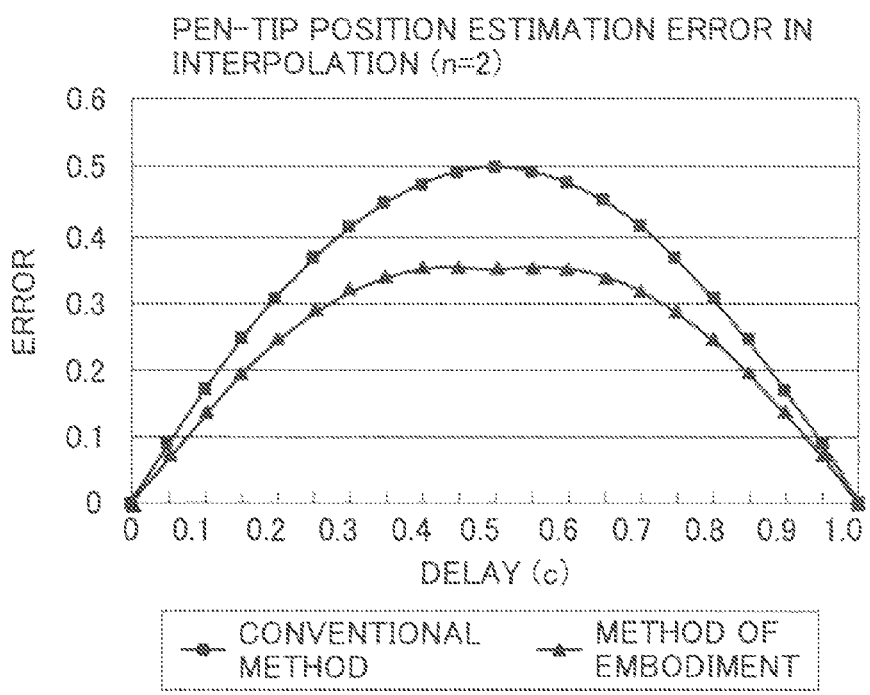
FIG. 12 is a diagram of the pen-tip position estimation errors caused by an interpolation method used in the coordinate inputting system according to the first embodiment of the invention and a relationship between a delay (c) and the pen-tip position estimation errors according to the present method and the conventional method when a sampling frequency n is 2.
Figure 13:
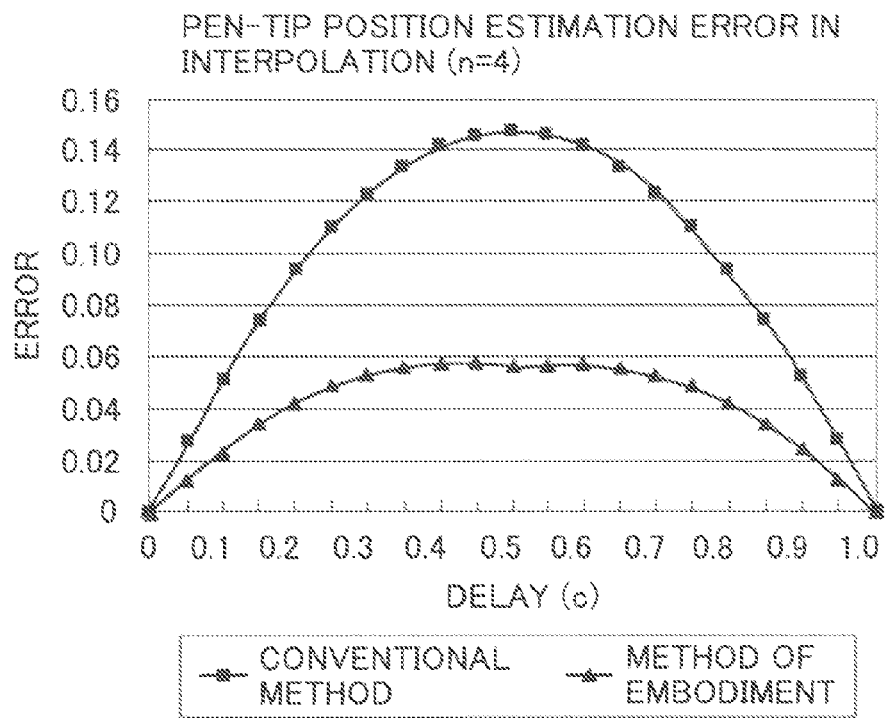
FIG. 13 is a diagram of the pen-tip position estimation errors caused by an interpolation method used in the coordinate inputting system according to the first embodiment of the invention and a relationship between the delay (c) and the pen-tip position estimation errors according to the present method and the conventional method when the sampling frequency n is 4.
Figure 14:
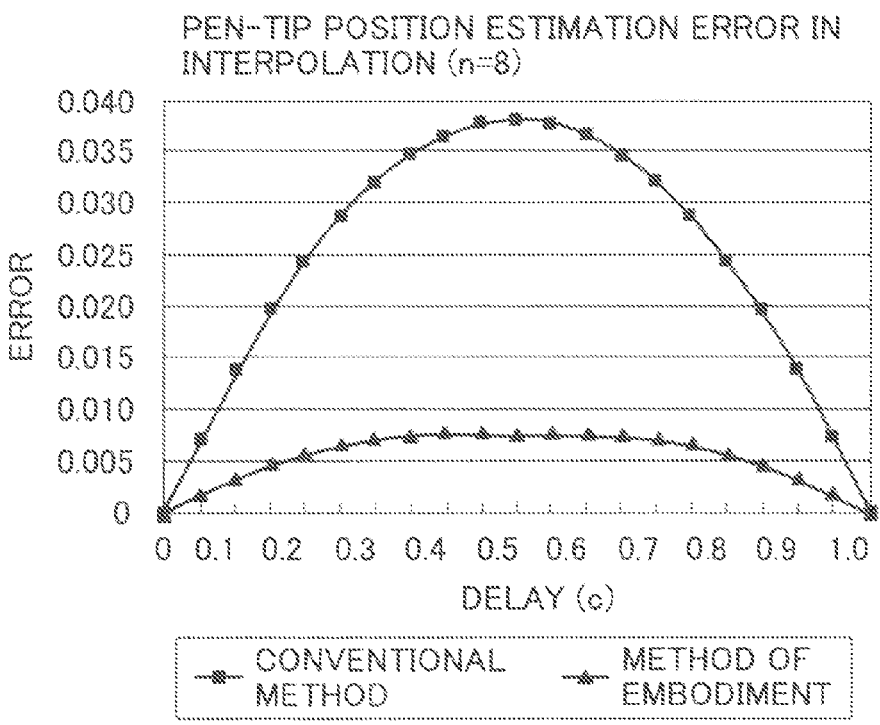
FIG. 14 is a diagram of the pen-tip position estimation errors caused by an interpolation method used in the coordinate inputting system according to the first embodiment of the invention and a relationship between the delay (c) and the pen-tip position estimation errors according to the present method and the conventional method when the sampling frequency n is 8.
Figure 15:
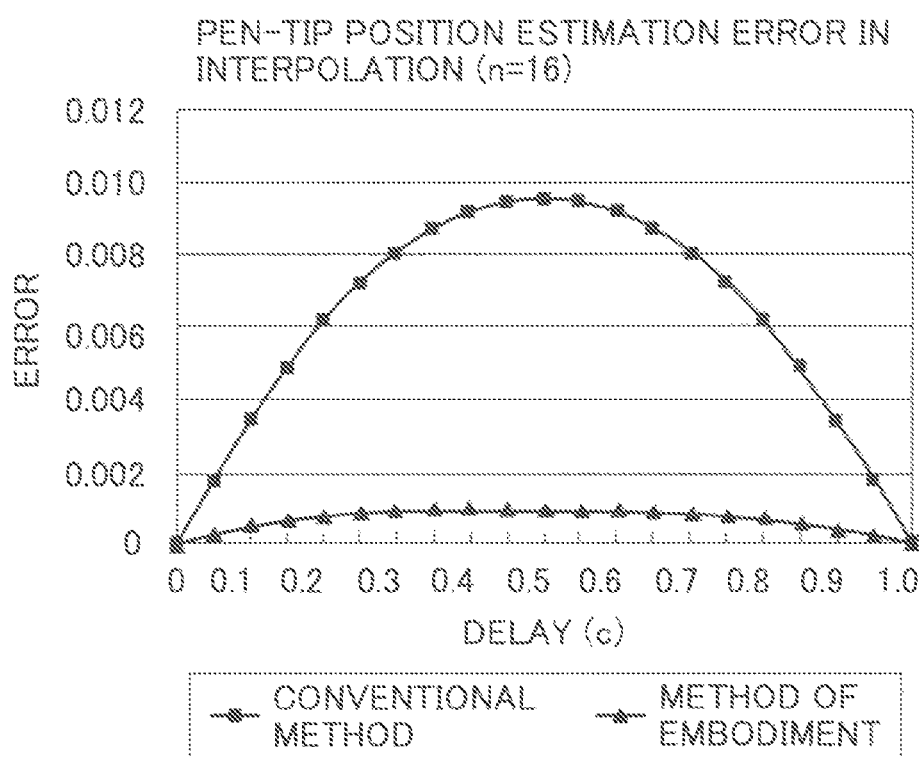
FIG. 15 is a diagram of the pen-tip position estimation errors caused by an interpolation method used in the coordinate inputting system according to the first embodiment of the invention and a relationship between the delay (c) and the pen-tip position estimation errors according to the present method and the conventional method when the sampling frequency n is 16.

A degree of reduction in the estimation error according to the embodiment from the estimation error in the conventional method will be described with reference to FIG. 11 to FIG. 15. FIG. 11 is a graph of the pen tip position estimation error and sampling frequency (n) according to the conventional interpolation method and according to the interpolation method used in the embodiment. Compared to the conventional interpolation method, the estimation errors clearly decrease as the sampling frequency increases in the interpolation method according to the embodiment.

FIG. 12 to FIG. 15 are diagrams of a relationship between the pen tip position estimation error and the delay (c) according to the conventional interpolation method and according to the interpolation method used in the embodiment. FIG. 12 to FIG. 15 respectively show the pen tip 4a position estimation errors when the sampling frequency (n) is set to 2, 4, 8, and 16.

As is clear from FIG. 12 to FIG. 15, when the delay (c) is set to 0.5 (0.5T), the pen tip 4a position estimation error can be significantly reduced compared to the conventional interpolation method. When the delay (c) is set to 0.85 (0.85T), not only can the pen tip 4a position estimation error be reduced compared to the conventional interpolation method, but the estimation error can be reduced compared to when the delay (c) is set to 0.5. As a result, it is clearly preferable that the delay time is near "0" or as closest to the cycle T as possible.

In this way, according to the embodiment, when the speaker 5 in the writing-instrument main body 4 transmits the first ultrasonic wave and the speaker 6 transmits the second ultrasonic wave with a delay after the transmission of the first ultrasonic wave, the coordinate detecting device 3 sets the interpolation time to the intermediate time between the transmission time of the first ultrasonic wave and the transmission time of the second ultrasonic wave. The delay is a time shorter than the cycle at which the first ultrasonic waves are transmitted. The coordinate detecting device 3 calculates the interpolation positions of the speaker 5 and the interpolation positions of the speaker 6 corresponding to the interpolation time. Then, the coordinate detecting device 3 estimates the pen tip 4a position that is away from the speaker 5 and the speaker 6, based on the interpolated positions. Therefore, the errors between the estimated pen tip 4a position and the actual pen tip 4a position can be reduced and the position of the pen tip 4a can be measured with high accuracy. In addition, a filter or the like is not required to be used to discriminate the two signals (first ultrasonic waves and the second ultrasonic waves), as is required in the conventional method. Therefore, manufacturing cost of the coordinate inputting system 1 can be reduced.

In addition, the interpolation position is set to the intermediate position between the first ultrasonic wave and the second ultrasonic wave. However, the interpolation position is merely required to be between the first ultrasonic wave and the second ultrasonic wave. As a result, the interpolation position can be adjusted to an optimum position to measure the pen tip 4a position with high accuracy.

The writing instrument 2 according to the embodiment includes the writing pressure detecting switch 9, the LED 7, and the LED 8. The writing pressure detecting switch 9 detects whether the writing-instrument main body 4 is being used to write. The LED 7 and the LED 8 are provided in the writing-instrument main body 4 and are used to transmit infrared pulses at the same cycle as the cycle at which the first ultrasonic waves are transmitted, when the writing-instrument main body 4 is being used to write. The writing instrument 2 simultaneously transmits the infrared pulses from the LED 7 and the LED 8 and the first ultrasonic waves from the speaker 5. The coordinate detecting device 3 includes the clock counter 23 and the speaker position detector 24. The clock counter 23 resets the values of the inputted first ultrasonic waves and the second ultrasonic waves when the infrared pulses are inputted. Therefore, the values of the first ultrasonic wave and the second ultrasonic wave inputted into the speaker position detector 24 in advance can be reset. Even when an angle of the writing instrument 2 continuously changes at a high speed or the pen tip 4a continuously moves at a high speed, the coordinate detecting device 3 can constantly receive the newest values of the first ultrasonic waves and the second ultrasonic waves from the speaker 5 and the speaker 6 and input the newest positions of the speaker 5 and the speaker 6 into the speaker position detector 24. Devices that transmit electromagnetic waves can be provided in place of the LED 7 and the LED 8. In other words, the electromagnetic waves are merely required to have a transmission speed that is faster than the transmission speed of the ultrasonic wave and a transmission time that is shorter by an amount that can be ignored than the transmission time of the ultrasonic waves.

FIG. 16 to FIG. 19 are diagrams of a coordinate detecting device, a writing instrument, and a coordinate inputting system according to a second embodiment of the present invention. Components that are the same as those in the first embodiment are given the same reference numbers. Explanations thereof are omitted.

Figure 16:
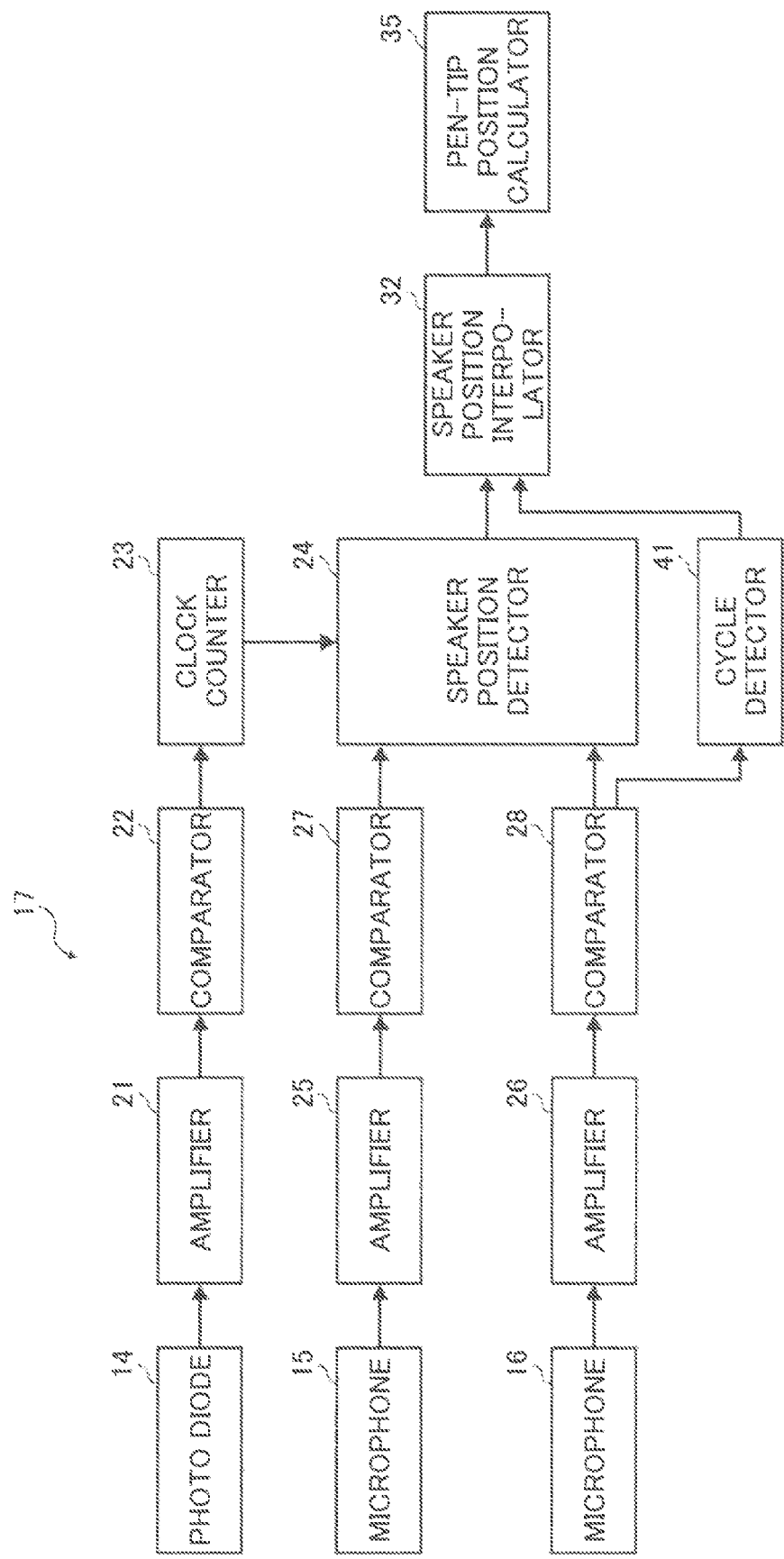
FIG. 16 is a block diagram of a coordinate detecting device in a coordinate inputting system according to a second embodiment of the invention.
Figure 17:
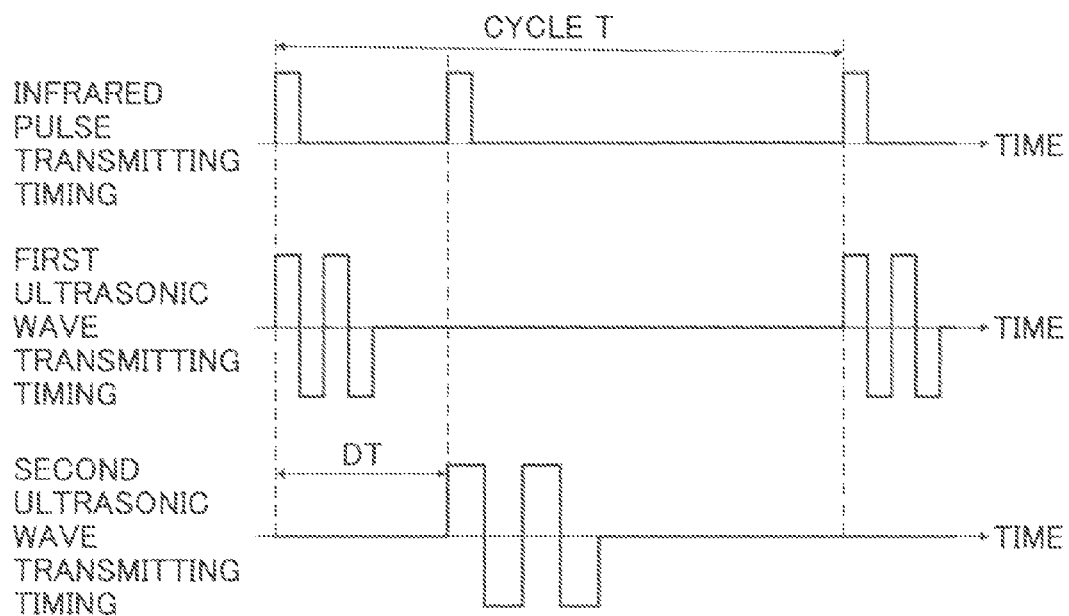
FIG. 17 is a diagram of transmitting timings of infrared pulses and ultrasonic waves from a writing instrument according to the second embodiment of the invention.
Figure 18:
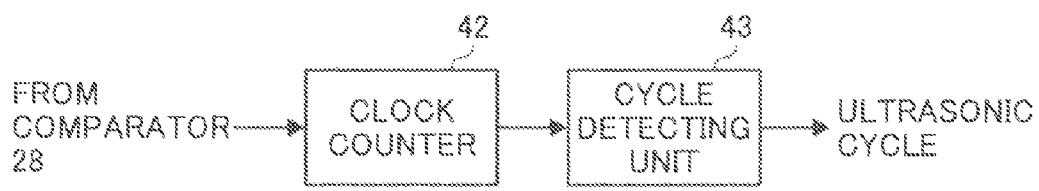
FIG. 18 is a block diagram of a frequency detector in the coordinate inputting system according to the second embodiment of the invention.
Figure 19:
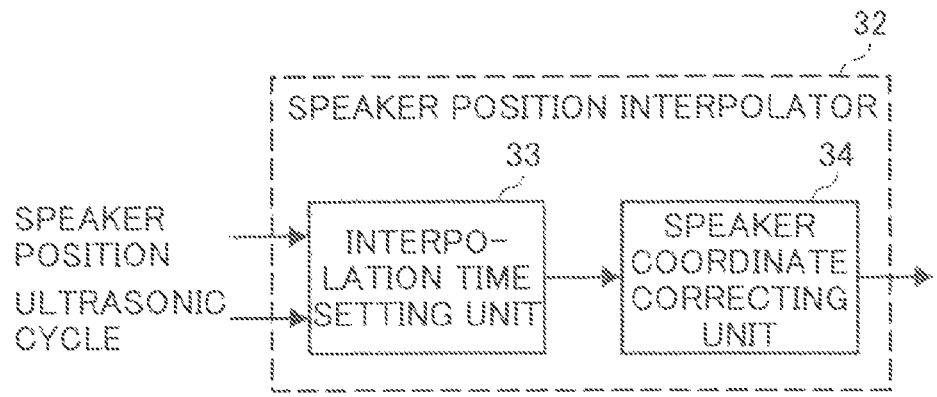
FIG. 19 is a diagram of a signal inputted into a speaker position interpolator in the coordinate inputting system according to the second embodiment of the invention.

In FIG. 16, the coordinate detecting device 3 includes a cycle detector 41. The cycle detector 41 detects the cycle of the second ultrasonic waves transmitted from the writing instrument 2. The ultrasonic wave transmitting circuit 11 in the writing instrument 2 transmits the second ultrasonic waves with a delay of delay time DT after the transmission of the first ultrasonic wave, at a cycle differing from the cycle of the first ultrasonic wave, as shown in FIG. 17. The second ultrasonic waves are set depending on a color of the writing instrument 2. In other words, the ultrasonic wave transmitting circuit 11 forms a cycle adjusting means. The cycle adjusting means adjusts the cycles of the first ultrasonic waves and the second ultrasonic waves and transmits the first ultrasonic waves and the second ultrasonic waves.

The writing instrument 2 transmits the second ultrasonic waves to the coordinate detecting device 3 at a cycle depending on the color of the wiring instrument 2. For example, the second ultrasonic wave is transmitted at a cycle A when the writing instrument 2 is black and at a cycle B when the writing instrument 2 is red.

The cycle detector 41 in the coordinate detecting device 3 includes a clock counter 42 and a cycle detecting unit 43. The clock counter 42 counts a clock per half cycle of the second ultrasonic wave, inputted from the comparator 28.

In addition, the cycle detecting unit 43 converts the clock count counted by the clock counter 42 to an ultrasonic wave cycle using the formula {clock cycle×clock count×2}. Then, the cycle detecting unit 43 outputs the converted ultrasonic wave to the speaker position interpolator 32 (see FIG. 19).

The speaker position interpolator 32 includes a table. In the table, the colors of the writing instrument 2, the cycles, and the speaker positions (in this case, the positions of the speaker 6) are correlated in advance. The speaker position interpolator 32 compares the ultrasonic waves outputted from the cycle detector 41 and the speaker coordinates (speaker position) inputted from the speaker coordinate calculator 31 with the table. The speaker position interpolator 32 can determine whether the transmitting source of the ultrasonic wave of which the frequency has been converted is the speaker 6 and what the color of the writing instrument 2 is.

In addition, the speaker position interpolator 32 can determine whether the transmission source of the ultrasonic wave of which the frequency has not been converted is the speaker 5. According to the embodiment, the cycle detector 41 and the speaker position interpolator 32 form the cycle detecting unit.

The speaker position interpolator 32 also similarly calculates the interpolation time based on the transmission time of the first ultrasonic wave and the transmission time of the second ultrasonic wave. As according to the first embodiment, the speaker position interpolator 32 sets the interpolation time to the intermediate time between transmission time of the first ultrasonic wave and the transmission time of the second ultrasonic wave. The method used to interpolate the position of the speaker 5 and the position of the speaker 6 and estimate the pen tip 4*a* position according to the embodiment is the same as that according to the first embodiment. Explanations thereof are omitted.

According to the embodiment, the writing instrument 2 transmits the first ultrasonic waves and the second ultrasonic waves at differing cycles. The coordinate detecting device 3 identifies the positions of the speaker 5 and the speaker 6 based on the cycles of the first ultrasonic waves and the second ultrasonic waves. Therefore, since the cycles of the first ultrasonic waves and the second ultrasonic waves differ depending on the color of the writing instrument 2 or the like, the color of the writing instrument 2 used to write on the paper can be judged and color coding can be performed.

The present invention can provide a coordinate detecting device, a writing instrument, and a coordinate inputting system at a low cost. The coordinate detecting device has a simple structure and can accurately detect a position of a pen tip or the like on a coordinate plane. The pen tip or the like is in a position away from a first transmitting unit and a second transmitting unit.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coordinate detecting device used in combination with a writing instrument including a body, a first transmitting unit provided in the body, a second transmitting unit provided in the body, and a tip that is provided at the body spaced from the first transmitting unit and the second transmitting unit, wherein the first transmitting unit generates a first signal, and the second transmitting unit generates a second signal delayed with respect to the first signal, the coordinate detecting device comprising:

a first receiving unit that receives the first signal from the first transmitting unit and the second signal from the second transmitting unit;

a second receiving unit that is spaced from the first receiving unit, and that receives the first signal and the second signal;

a position calculating unit that calculates a position of the first transmitting unit based on a time at which the first receiving unit receives the first signal and a time at which the second receiving unit receives the first signal on a predetermined coordinate plane, and calculates a position of the second transmitting unit based on a time at which the first receiving unit receives the second signal and a time at which the second receiving unit receives the second signal on the predetermined coordinate plane;

an interpolating unit that includes
an interpolation-time calculating unit that calculates an interpolation time based on times of generation of the first signal and the second signal, and
an interpolation-position calculating unit that calculates the interpolated position of the first transmitting unit and the interpolated position of the second transmitting unit, each of the positions being at the interpolation time; and an estimating unit that estimates a position of the tip on the predetermined coordinate plane based on the interpolated position of the first transmitting unit and the interpolated position of the second transmitting unit, wherein the interpolating unit calculates a time point between a generation timing of the first transmitting unit and a generation timing of the second transmitting unit as the interpolated time point wherein the interpolated time point is different from both of the generation timing of the first transmitting unit and the generation timing of the second transmitting unit.

2. The coordinate detecting device according to claim 1, wherein the interpolating unit calculates a time point halfway between the generation timing of the first transmitting unit and the generation timing of the second transmitting unit as the interpolated time point.

3. The coordinate detecting device according to claim 1, further comprising a cycle detecting unit that detects a cycle of the first signal and a cycle of the second signal, wherein
the position calculating unit calculates the position of the first transmitting unit and the position of the second transmitting unit based on the cycle of the first signal and the cycle of the second signal detected by the cycle detecting unit.

4. The coordinate detecting device according to claim 1, further comprising a third receiving unit that receives a third signal transmitted from a third generating unit located at a position different from that of the first transmitting unit and the second transmitting unit, a cycle of the third signal being same as that of the first signal, wherein
the coordinate detecting device further includes a resetting unit that resets input of the first signal and input of the second signal when the third receiving unit receives the third signal.

5. The coordinate detecting device according to claim 4, wherein the first signal and the second signal are ultrasonic waves and the third signal is any one of an infrared pulse and an electromagnetic wave.

6. A coordinate inputting system including:
a writing instrument; and
a coordinate detecting device that detects pen tip coordinates, wherein
the writing instrument includes:
 a body;
 a first transmitting unit provided in the body that generates a first signal; and
 a second transmitting unit provided in the body that generates a second signal, the second signal being delayed with respect to the first signal, and
the coordinate detecting device includes:
 a first receiving unit that receives the first signal from the first transmitting unit and the second signal from the second transmitting unit;
 a second receiving unit that is spaced from the first receiving unit, and that receives the first signal and the second signal;
 a position calculating unit that calculates a position of the first transmitting unit based on a time at which the first receiving unit receives the first signal and a time at which the second receiving unit receives the first signal, and calculates a position of the second transmitting unit based on a time at which the first receiving unit receives the second signal and a time at which the second receiving unit receives the second signal on a predetermined coordinate plane;
 an interpolating unit includes
  an interpolation-time calculating unit that calculates an interpolation time based on times of generation of the first signal and the second signal, and
  an interpolation-position calculating unit that calculates the interpolated position of the first transmitting unit and the interpolated position of the second transmitting unit, each of the positions being at the interpolation time; and
 an estimating unit that estimates a position of the tip on the predetermined coordinate plane based on the interpolated position of the first transmitting unit and the interpolated position of the second transmitting unit,
wherein the interpolating unit calculates a time point between a generation timing of the first transmitting unit and a generation timing of the second transmitting unit as the interpolated time point wherein the interpolated time point is different from both of the generation timing of the first transmitting unit and the generation timing of the second transmitting unit.

7. The coordinate inputting system according to claim 6, wherein the interpolating unit calculates a time point halfway between the generating timing of the first transmitting unit and the generation timing of the second transmitting unit as the interpolated time point.

8. The coordinate inputting system according to claim 6, wherein
the writing instrument further includes a cycle adjusting unit that adjusts cycles of generation of the first signal and the second signal,
the coordinate detecting device includes a cycle detecting unit that detects a cycle of the first signal and a cycle of the second signal, and
the position calculating unit calculates the position of the first transmitting unit and the position of the second transmitting unit based on the cycle of the first signal and the cycle of the second signal detected by the cycle detecting unit.

9. The coordinate inputting system according to claim 6, wherein the writing instrument includes
a writing state detecting unit that detects whether the body is being used for writing; and
a third generating unit that generates a third signal at same cycle as that of the first signal when the writing state detecting unit judges that the body is being used for writing, wherein
the first transmitting unit generates the first signal at a timing at which the third generating unit generates the third signal,
the coordinate detecting unit includes a third receiving unit that receives the third signal from the third generating unit, and
the position calculating unit includes a resetting unit that resets input of the first signal and input of the second signal when the third receiving unit receives the third signal.

10. The coordinate inputting system according to claim 9, wherein the first signal and the second signal are ultrasonic waves and the third signal is any one of an infrared pulse and an electromagnetic wave.

* * * * *